United States Patent
Xia et al.

(10) Patent No.: US 11,387,690 B1
(45) Date of Patent: Jul. 12, 2022

(54) SELF-ALIGNING WIRELESS POWER TRANSFER SYSTEM THAT SWITCHES POWER CURRENT INTO ALIGNING ELECTROMAGNETS

(71) Applicant: Hong Kong Applied Science and Technology Research Institute Company, Limited, Hong Kong (HK)

(72) Inventors: Minglu Xia, Hong Kong (HK); Kun Wu, Hong Kong (HK); Ziyang Gao, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 17/198,427

(22) Filed: Mar. 11, 2021

(51) Int. Cl.
  *H02J 50/90* (2016.01)
  *H01F 38/14* (2006.01)
  *H02J 50/12* (2016.01)

(52) U.S. Cl.
  CPC .............. *H02J 50/90* (2016.02); *H01F 38/14* (2013.01); *H02J 50/12* (2016.02)

(58) Field of Classification Search
  CPC ............ H02J 50/90; H02J 50/12; H01F 38/14
  See application file for complete search history.

(56) References Cited

U.S. PATENT DOCUMENTS

| | | | |
|---|---|---|---|
| 7,889,445 B2 | 2/2011 | Yang et al. | |
| 9,845,018 B2 | 12/2017 | Dede et al. | |
| 10,072,947 B1 | 9/2018 | Mantier | |
| 10,343,535 B2 | 7/2019 | Cook et al. | |
| 10,381,884 B2 | 8/2019 | Shaw et al. | |
| 10,688,874 B2 | 6/2020 | Kwasnick et al. | |

(Continued)

FOREIGN PATENT DOCUMENTS

| | | | |
|---|---|---|---|
| CN | 107985095 A | 5/2018 | |
| CN | 104025422 B | * 10/2018 | ......... B60L 15/2009 |

(Continued)

OTHER PUBLICATIONS

ISR and Written Opinion, PCT/CN2021/081453, dated Dec. 1, 2021.

*Primary Examiner* — Pinping Sun
(74) *Attorney, Agent, or Firm* — gPatent LLC; Stuart T. Auvinen

(57) ABSTRACT

A wireless power transmitter has electromagnets and a transmitter coil mounted on a moving plate. Current in the main DC circuit is switched into the electromagnets by transistors that control the amount and direction of current through the electromagnets to control the strength and polarity of electromagnetic fields generated by the electromagnets. A controller initially drives a high gate voltage onto transistors to cause the electromagnets on the transmitter to generate a maximum attractive force with magnets on the receiver, causing the moving plate to move the transmitter coil into closer alignment with the receiver coil. A power factor is measured on both receiver and transmitter to estimate the power transfer efficiency. The controller then reduces the gate voltage by a step size and the power factors are measured again. The gate voltage continues to be adjusted to optimize the power transfer efficiency until reaching a maxima.

12 Claims, 11 Drawing Sheets

(56) References Cited

U.S. PATENT DOCUMENTS

| | | | | |
|---|---|---|---|---|
| 2012/0112553 A1* | 5/2012 | Stoner, Jr. | ............... | H02J 50/70 |
| | | | | 307/104 |
| 2012/0146426 A1* | 6/2012 | Sabo | ................ | H02J 50/40 |
| | | | | 307/104 |
| 2014/0285029 A1* | 9/2014 | Ichikawa | ................ | H02J 7/025 |
| | | | | 307/104 |
| 2015/0318709 A1* | 11/2015 | Jol | ................ | H02J 50/80 |
| | | | | 307/104 |
| 2016/0064141 A1* | 3/2016 | Graham | ................ | H01F 38/14 |
| | | | | 336/84 M |
| 2016/0134134 A1* | 5/2016 | Baarman | ................ | H02J 50/80 |
| | | | | 307/104 |
| 2020/0227954 A1* | 7/2020 | Ding | ................ | H02J 50/10 |
| 2020/0412181 A1* | 12/2020 | Sun | ................ | H01F 38/14 |
| 2021/0259053 A1* | 8/2021 | Simpson | ................ | H05B 3/0014 |

FOREIGN PATENT DOCUMENTS

| | | | | |
|---|---|---|---|---|
| CN | 110571952 A | 12/2019 | | |
| CN | 110707779 A | 1/2020 | | |
| CN | 111130227 A | 5/2020 | | |
| CN | 112087065 A | 12/2020 | | |
| WO | WO-2019227213 A1 * | 12/2019 | ............. | H01F 38/14 |

\* cited by examiner

SELF-ALIGNING WIRELESS POWER TRANSFER SYSTEM THAT SWITCHES POWER CURRENT INTO ALIGNING ELECTROMAGNETS

FIELD OF THE INVENTION

This invention relates to wireless power-delivery systems, and more particularly to self-alignment of power-delivery systems.

BACKGROUND OF THE INVENTION

Bulky cables and wires have traditionally been used to deliver electrical power to devices. More recently, wireless power delivery is being used to recharge battery-powered devices. For example, a phone can be recharged by placement in a cradle that aligns a receiver in the phone with a wireless power transmitter. Magnets can be used to improve the alignment between the power transmitter and receiver. Power is transferred without wires by a time-varying electromagnetic field between the power transmitter and receiver.

FIG. 1 shows a prior-art wireless power delivery system. Power supply 102 is connected by cables or wires to deliver power to transmitter 104. Transmitter 104 generates a time-varying current that is applied to transmitter coil 110 to generate a time-varying electromagnetic field that induces a current in receiver coil 112. Receiver 106 converts the induced current from receiver coil 112 to a local current that powers load 108.

Transmitter coil 110 and receiver coil 112 must be aligned with each other so that wireless power transfer can efficiently occur. As the distance between transmitter coil 110 and receiver coil 112 increase, the strength of the electromagnetic field near receiver coil 112 decreases, as does the induced current and power transferred.

Also, the central axis of transmitter coil 110 should be aligned with the central axis of receiver coil 112. When receiver coil 112 is shifted sideways in FIG. 1 relative to transmitter coil 110, their central axes become mis-aligned, and the induced current and power transferred is reduced.

When a capacitor is added in series to the coil circuits, LC resonant circuits are created. Power is wirelessly transferred by matching the resonance frequency of the transmitter and receiver circuits. Magnetic resonance can transmit power wirelessly over longer distances than can be achieved by non-resonant circuits using electromagnetic induction.

FIGS. 2A-2B show magnetic resonance wireless power transfer efficiency as a function of mis-alignment. In FIG. 2A, as the mis-alignment in the X direction between the central axes of transmitter coil 110 and receiver coil 112 increases, the power transfer efficiency decreases. This is the horizontal or X direction in FIG. 1. Misalignment would also increase when receiver coil 112 was moved away from the transmitter coil, in the Y direction.

For wireless power transfer using electromagnetic induction, efficiency increases monotonically with smaller distances between transmitter and receiver. However, for wireless transfer using magnetic resonance, efficiency is reduced when the transmitter and receiver are too close together. In FIG. 2B, for one particular wireless transfer system using magnetic resonance, maximum efficiency occurs when transmitter coil 110 and receiver coil 112 are about 16 cm apart. As the Z distance or air gap between transmitter coil 110 and receiver coil 112 (vertical direction in FIG. 1) increases for larger distances beyond this maxima, the power transfer efficiency decreases. However, power transfer efficiency also decreases when transmitter coil 110 and receiver coil 112 are too close, such as for distances of less than 16 cm.

Depending on the size and shape of the coils and the characteristics of the alternating current supplied by the transmitter, the coupled electromagnetic field or mutual flux generated between transmitter coil 110 and receiver coil 112 is reduced by anti-resonance when transmitter coil 110 and receiver coil 112 are too close together. Such over-coupling results in flux leakage that reduces power transfer efficiency.

Simply forcing the receiver to be as close as possible to the transmitter may not produce the maximum power-transfer efficiency for magnetic resonance systems. When too close, power transfer efficiency drops and more energy is converted to heat. Both transmitter and receiver may overheat due to the power-transfer inefficiency shown in FIG. 2B.

The design of the transmitter and receiver could introduce a physical spacer that prevents transmitter coil 110 and receiver coil 112 from being too close. However, the maxima efficiency Z distance may change with conditions, such as temperature, input power, output power, etc., rather than a fixed value. In addition, such a spacer may not be physically practical in robotic or transportation systems.

What is desired is a wireless power transfer system with consistently optimized alignment for optimized efficiency. It is desired to actively align the transmitter coil and the receiver coil to improve the power-transfer efficiency. A self-alignment system that is built into the transmitter is desired. An adaptive self-alignment system that can adjust both the in-plane X,Y distance and the out-of-plane Z distance to reach a maximum power-transfer efficiency is desired, especially in a magnetic resonance wireless power transfer system.

DETAILED DESCRIPTION

The present invention relates to an improvement in self-aligning wireless power transfer systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
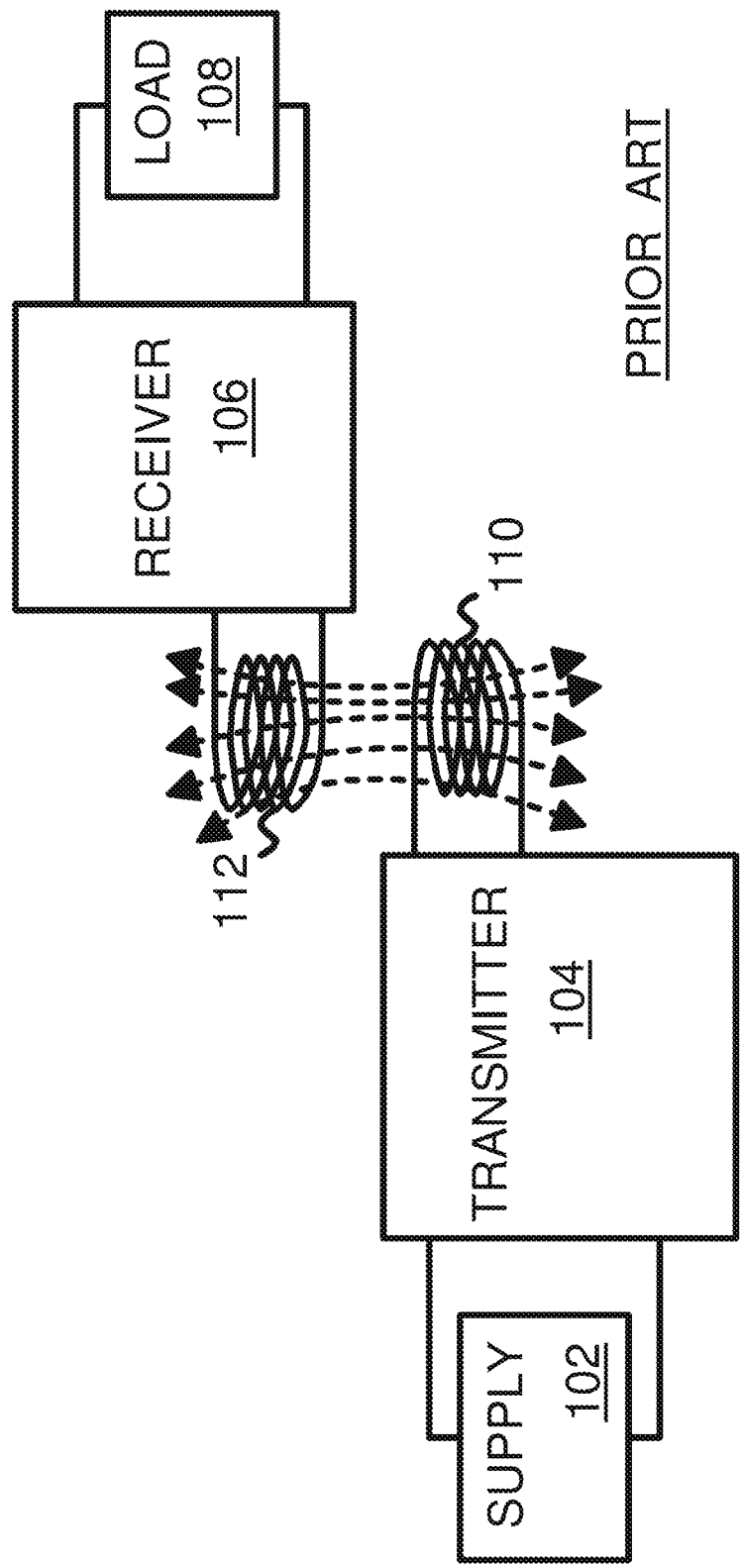
FIG. 1 shows a prior-art wireless power delivery system.
Figure 2A:
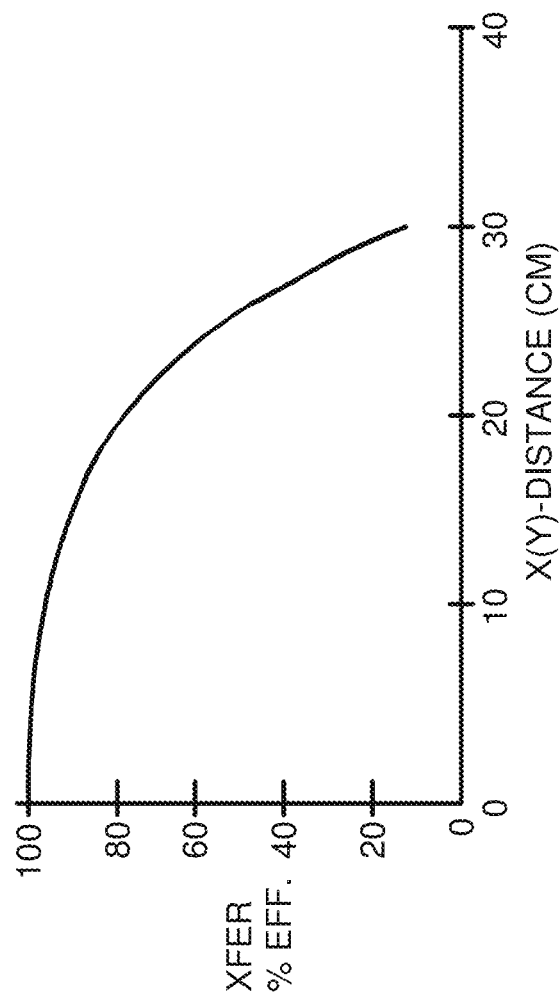
FIGS. 2A-2B show magnetic resonance wireless power transfer efficiency as a function of mis-alignment.
Figure 2B:
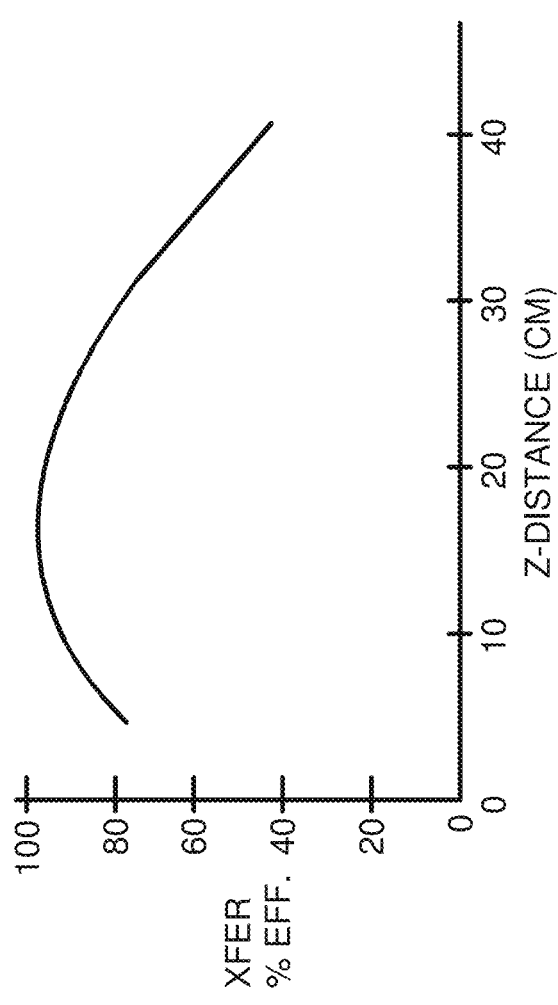
Figure 3:
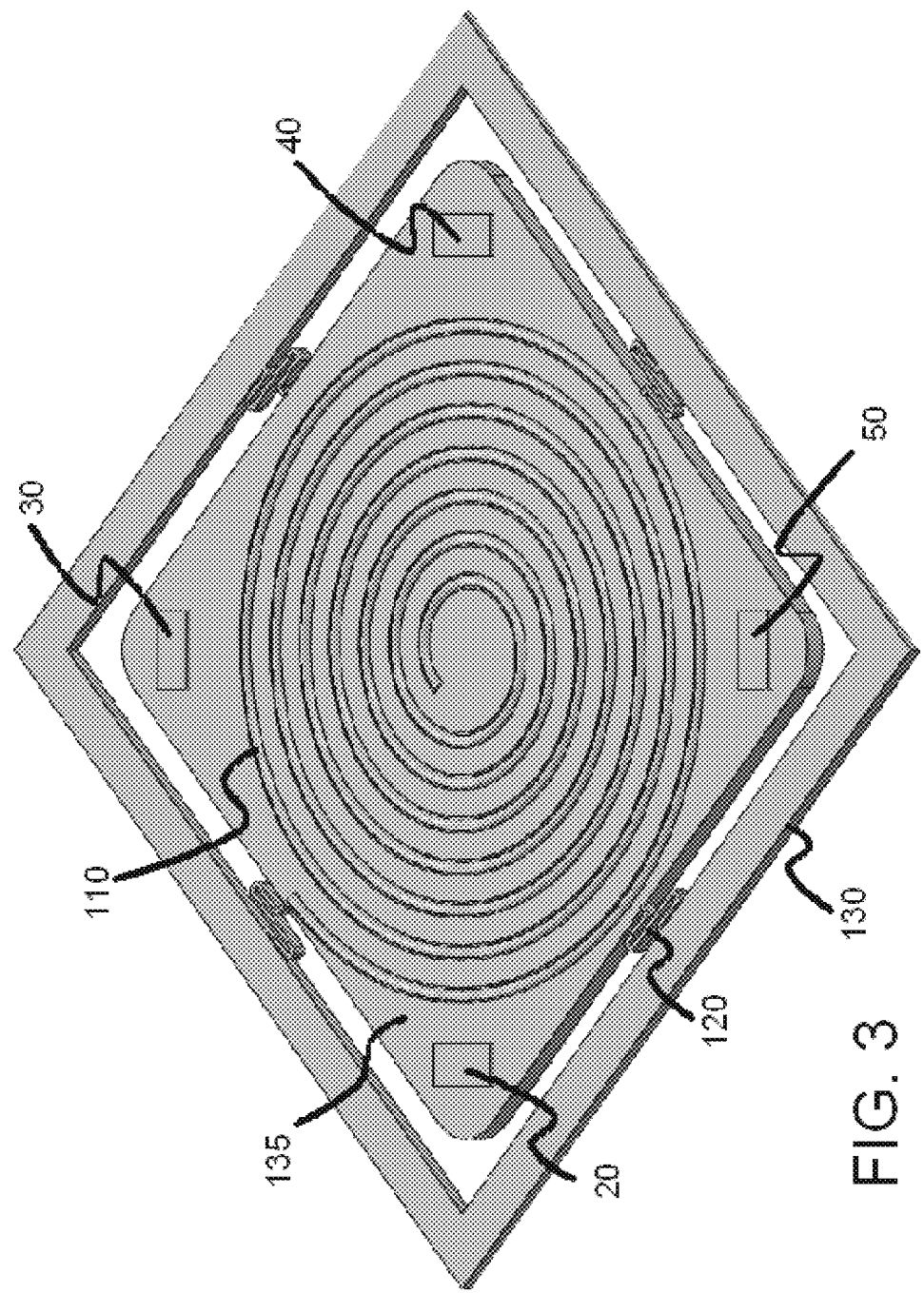
FIG. 3 shows a mechanical design of a self-aligning wireless power transmitter.

FIG. 3 shows a mechanical design of a self-aligning wireless power transmitter. Transmitter coil 110 is formed on or fixed to central moving plate 135. Springs 120 connect central moving plate 135 to rigid frame 130, allowing transmitter coil 110 and central moving plate 135 to move relative to rigid frame 130, which is fixed to other parts of the transmitter. Flexible wires (not shown) can connect transmitter coil 110 to the driving circuitry of the transmitter that are fixed to rigid frame 130. These flexible wires are sufficiently long to allow transmitter coil 110 and central moving plate 135 to move within rigid frame 130.

Electromagnets 20, 30, 40, 50 are placed at fixed positions in the corners of central moving plate 135. Electromagnets 20, 30, 40, 50 can also be connected to flexible wires (not shown) to allow them to be powered by a controller in the transmitter attached to rigid frame 130. When central moving plate 135 moves during self-alignment, electromagnets 20, 30, 40, 50 and transmitter coil 110 move together, being fixed to central moving plate 135. However, rigid frame 130 does not move and remains in a fixed position relative to the rest of the transmitter.

When the transmitter of FIG. 3 is placed in rough alignment with a receiver having a similar layout, but with receiver coil 112 and four magnets, then electromagnets 20, 30, 40, 50 can be powered to attract the four magnets in the receiver. This magnetic attraction causes electromagnets 20, 30, 40, 50 to pull central moving plate 135 with transmitter coil 110 closer to align with the receiver, causing springs 120 to flex, compress, extend, or otherwise elastically deform as needed.

Figure 4:
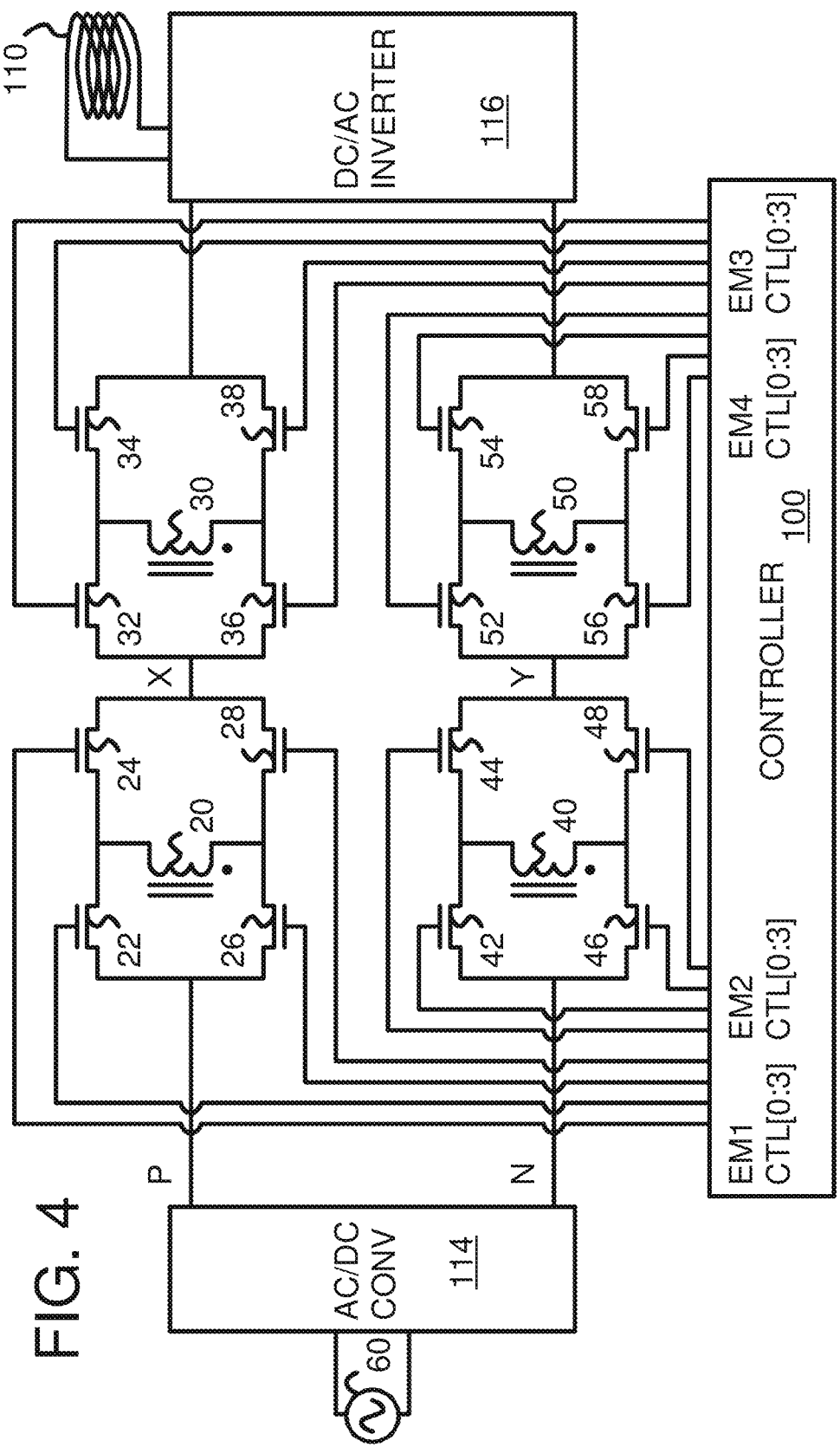
FIG. 4 is a schematic diagram of self-alignment electromagnets integrated with the wireless power transfer circuit.

FIG. 4 is a schematic diagram of self-alignment electromagnets integrated with the wireless power transfer circuit. Alternating Current (AC) power supply 60 drives AC/DC converter 114 to generate Direct Current (DC) on lines P, N. Current on lines P, N pass through a switching network and then drive DC/AC inverter 116, which powers transmitter coil 110. The DC current on lines P, N can be switched through electromagnets 20, 30, 40, 50 before powering transmitter coil 110 through DC/AC inverter 116.

Each one of electromagnets 20, 30, 40, 50 is surrounded by four transistors. These four transistors allow the amount and direction of current through the electromagnet to be adjusted. These transistors can be Metal-Oxide-Semiconductor Field-Effect Transistor (MOSFET) transistors.

For example, electromagnet 20 is surrounded by transistors 22, 24, 26, 28. When the gates of transistors 22, 28 are driven high, and the gates of transistors 24, 26 are driven low, the DC current is allowed to flow through electromagnet 20 in a downward direction, from node P, through transistor 22, electromagnet 20, and transistor 28, to node X, causing electromagnet 20 to generate an electromagnetic field with a North (N) orientation pointed downward.

Alternately, when the gates of transistors 22, 28 are driven low, and the gates of transistors 24, 26 are driven high, the DC current is allowed to flow through electromagnet 20 in an upward direction, from node P through transistor 26, electromagnet 20, and transistor 24 to node X, causing electromagnet 20 to generate an electromagnetic field with a N orientation pointed upward.

When the gates of both transistors 22, 24 are high, and the gates of transistors 26, 28 are both low, current is bypassed around electromagnet 20 from node P to node X, causing electromagnet 20 to be turned off and not generate an effective electromagnetic field. Alternately, when the gates of both transistors 26, 28 are high, and the gates of transistors 22, 24 are both low, current is also bypassed around electromagnet 20 from node P to node X, causing electromagnet 20 to be turned off and not generate a significant electromagnetic field.

Controller 100 generates gate control signals EM1_CTL[0:3] that are applied to the gates of transistors 22, 24, 26, 28. Controller 100 likewise generates gate control signals EM2_CTL[0:3] that are applied to the gates of transistors 42, 44, 46, 48 that surround electromagnet 40, gate control signals EM3_CTL[0:3] that are applied to the gates of transistors 32, 34, 36, 38 that surround electromagnet 30, and gate control signals EM4_CTL[0:3] that are applied to the gates of transistors 52, 54, 56, 58 that surround electromagnet 50.

These gate control signals can be analog voltages rather than binary digital on/off signals. The low gate voltages can still be non-zero and above the transistor threshold voltage so that some current flows through the "off" transistors, while a much larger current flows through the "on" transistors. The current is split into one current branch through the electromagnet and another current branch bypassing the electromagnet. Thus the DC current is steered through the transistors. The current through the electromagnet is adjusted to allow the strength and direction of the generated electromagnetic field to be adjusted.

The total current through DC/AC inverter 116 and transmitter coil 110 does not have to be changed when the strength of the electromagnetic fields generated by electromagnets 20, 30, 40, 50 is adjusted. The adjustment in gate voltages causes more or less current to flow through an electromagnet, while the remaining current is bypassed around that electromagnet, so that the total current in the main DC circuit remains constant. The total current is the sum of the electromagnet current and the bypass current.

Figure 5:
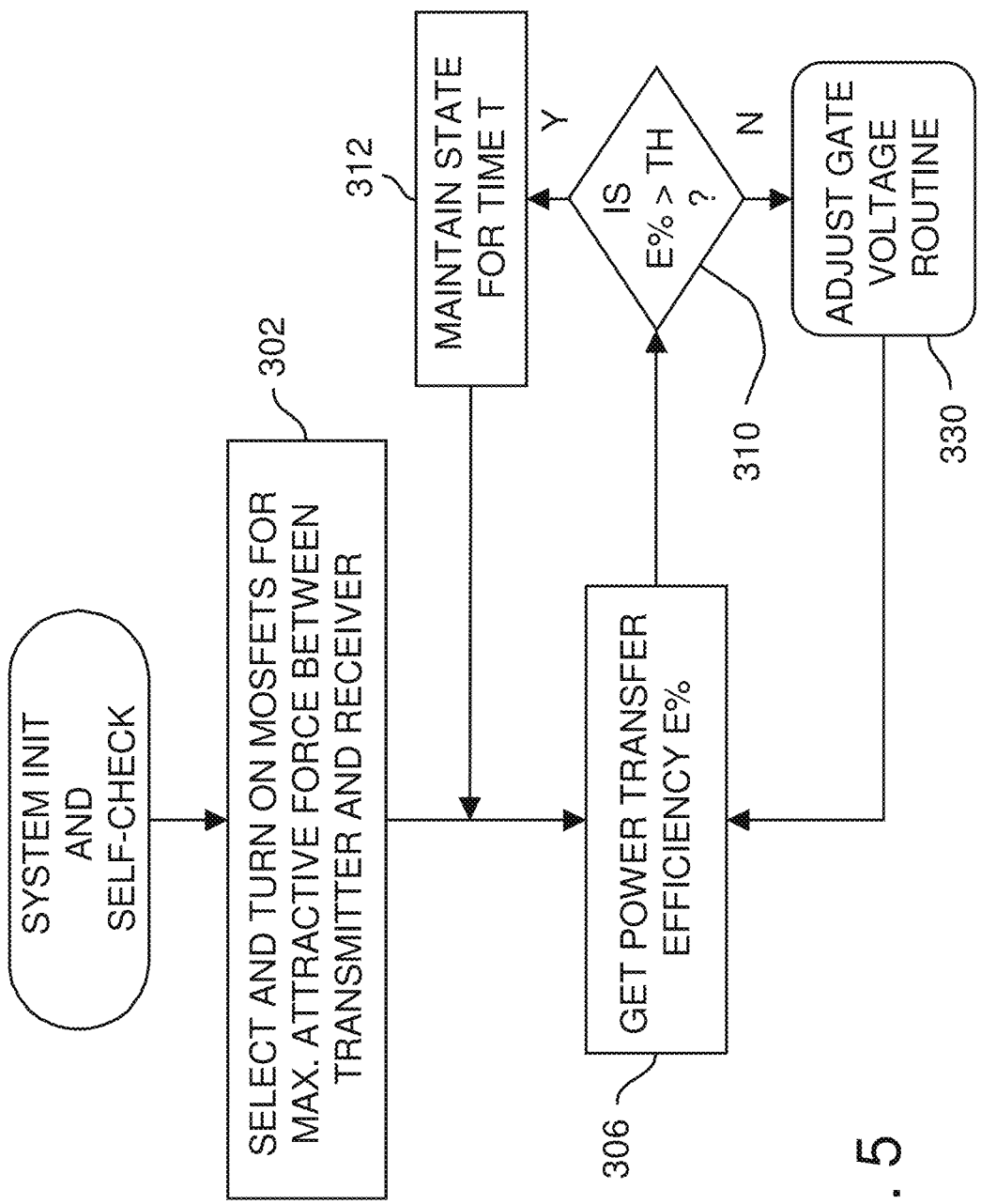
FIG. 5 is a flowchart of an initialization routine that self-aligns a wireless power-transfer transmitter with a receiver.

FIG. 5 is a flowchart of an initialization routine that self-aligns a wireless power-transfer transmitter with a receiver. The transmitter and receiver are pre-aligned to a rough alignment, such as by driving an EV over a charging pad. The pre-alignment produces an alignment that is sufficiently accurate so that some power may be wirelessly transferred from the transmitter to the receiver, although not necessarily at a high efficiency.

Pre-alignment places electromagnets 20, 30, 40, 50 in position near four corresponding magnets in the receiver. These four magnets on the receiver could have all their N poles pointing toward the transmitter, or could have all their S poles facing the transmitter, or could alternate so that two have N poles and two have S poles facing the transmitter, or have some other pre-determined arrangement. The exact configuration of the receiver magnets should be known since it is determined by the receiver's design. Also, the orientation of the transmitter's electromagnets 20, 30, 40, 50 to the receiver magnets when pre-aligned should also be determined by the overall system design.

When electromagnet 20 is placed near a receiver magnet with a S pole facing the transmitter, electromagnet 20 should be powered so that it generates an electromagnetic field with a N pole facing the receiver magnet. In this example, the gates of transistors 22, 28 are driven high, and the gates of transistors 24, 26 are driven low, so that the DC current is allowed to flow through electromagnet 20 in a downward direction, causing electromagnet 20 to generate an electromagnetic field with a N pole pointed toward the receiver that would attract the S pole of the corresponding receiver magnet. The gate voltages of transistors around electromagnet 20 are set to a voltage value that generates a maximum attractive force with the corresponding receiver magnet.

Likewise, electromagnet 30 may be placed near a receiver magnet with a N pole facing electromagnet 30. Then controller 100 generates a high voltage to apply to the gates of transistors 34, 36, and a low voltage to the gates of transistors 32, 38, to steer current through electromagnet 30 in an upward direction, causing electromagnet 30 to generate an electromagnetic field with a S orientation pointed toward the receiver that would attract the N-pole of the corresponding receiver magnet.

In a similar manner, other transistors are selected and turned on with high gate voltages or off with low gate voltages to generate a maximum attractive force between transmitter electromagnets 20, 30, 40, 50 and their corresponding magnets on the receiver, step 302. This maximum attractive force will pull electromagnets 20, 30, 40, 50 closest to the receiver magnets in both horizontal and vertical directions. Springs 120 (FIG. 3) allow movement of central moving plate 135 that electromagnets 20, 30, 40, 50, and transmitter coil 110 are fixed to. This movement can be in-plane in the X,Y direction, parallel to the plane of central moving plate 135, and also out-of-plane in the Z direction, perpendicular to the plane of central moving plate 135.

The attractive force generated by electromagnets 20, 30, 40, 50 causes central moving plate 135 to be pulled into a better alignment position with the receiver. This better alignment position should improve the wireless power transfer efficiency, since transmitter coil 110 is better aligned with receiver coil 112.

The wireless power transfer efficiency (E %) is measured, step 306. Power transfer efficiency can be determined by comparing the received power at the receiver to the transmitted power at the transmitter. The transmitted power can be obtained by measuring the current flowing through transmitter coil 110, or by measuring the current in other parts of the transmitter, such as the current flowing through line P, depending on the system requirement. The voltage of line P could also be measured or estimated to obtain the transmitter power as $P=I*V$. A similar measurement could be made of current and voltage inducted into receiver coil 112, or at another point in the receiver. The receiver could send the power measurement to the transmitter over a wireless link, such as a separate Bluetooth or Wifi link between the transmitter and receiver. Then the transmitter can generate the power transfer efficiency E % as the ratio of received power and transmitted power.

When the estimated wireless power transfer efficiency E % is greater than an efficiency threshold TH, step 310, self-alignment using electromagnets 20, 30, 40, 50 has optimized the wireless power transmission status, and the efficiency has entered an acceptable range. The gate voltages are maintained for a period of time T, step 312, before the power transfer efficiency is checked again, step 306.

When the measured power transfer efficiency E % is less than the efficiency threshold TH, step 310, self-alignment using electromagnets 20, 30, 40, 50 has not yet sufficiently optimized efficiency. The gate voltages are adjusted using gate voltage adjustment routine 330 (FIG. 8), and the power transfer efficiency re-measured, step 306, to see if the further adjustments can improve efficiency above the threshold value, step 310.

Figure 6:
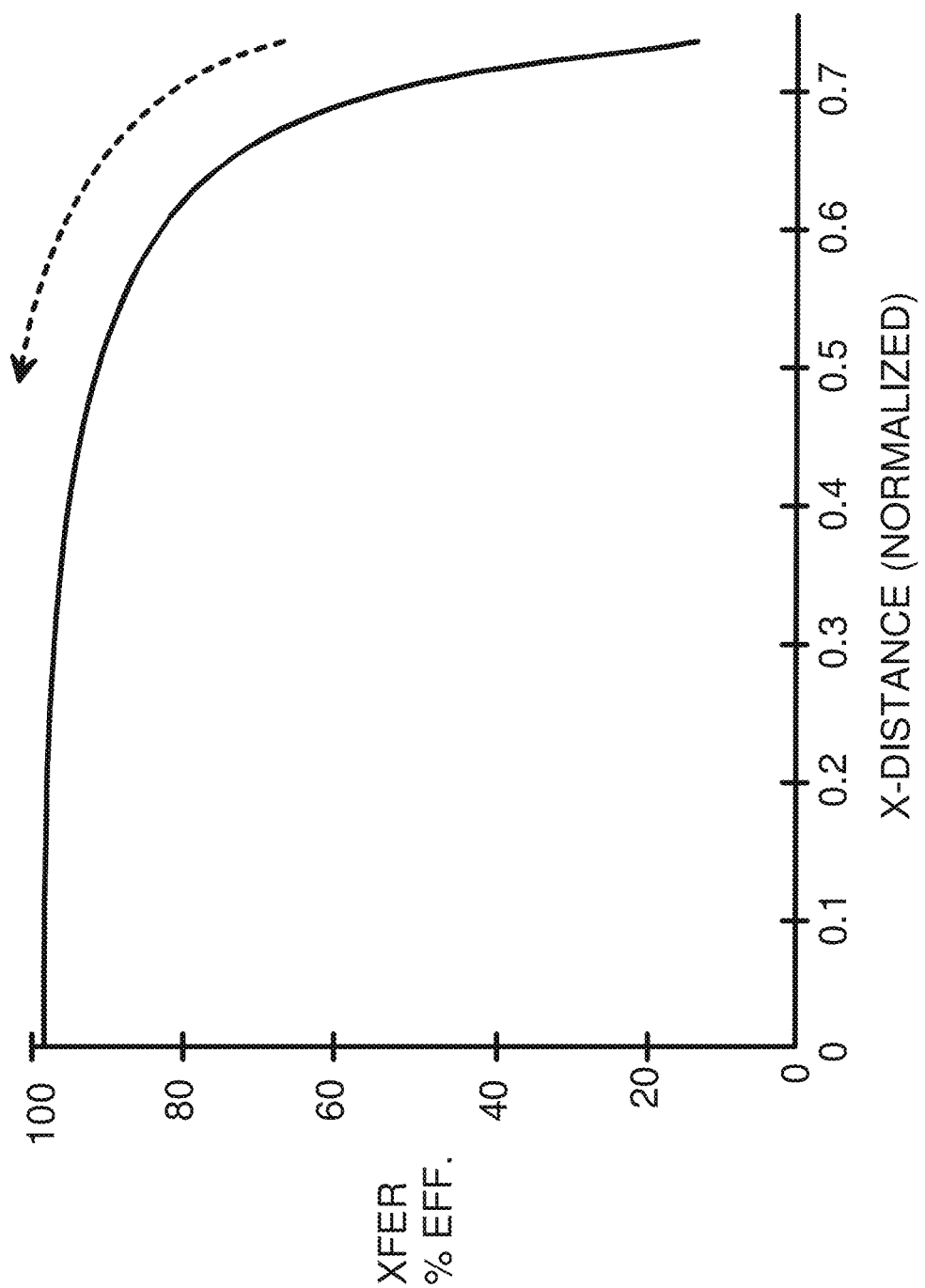
FIG. 6 is a graph of power transfer efficiency as a function of in-plane mis-alignment.

FIG. 6 is a graph of wireless power transfer efficiency as a function of in-plane mis-alignment. When powered, electromagnets 20, 30, 40, 50 pull central moving plate 135 in three dimensions to better align with magnets on the receiver. The three-dimensional movement can be decomposed into in-plane X,Y movement and out-of-plane Z movement. The movements within the plane of central moving plate 135 are referred to as in-plane or X,Y movement.

Transmitter coil 110 and receiver coil 112 have their axes perfectly aligned at X=0 and Y=0. Mis-alignments within a normalized value of about 0.5 result in a small drop in wireless power-transfer efficiency for this particular system. However, power transfer efficiency is more severely reduced when the normalized in-plane distance is above 0.5, as seen in the graph of FIG. 6.

Figure 7:
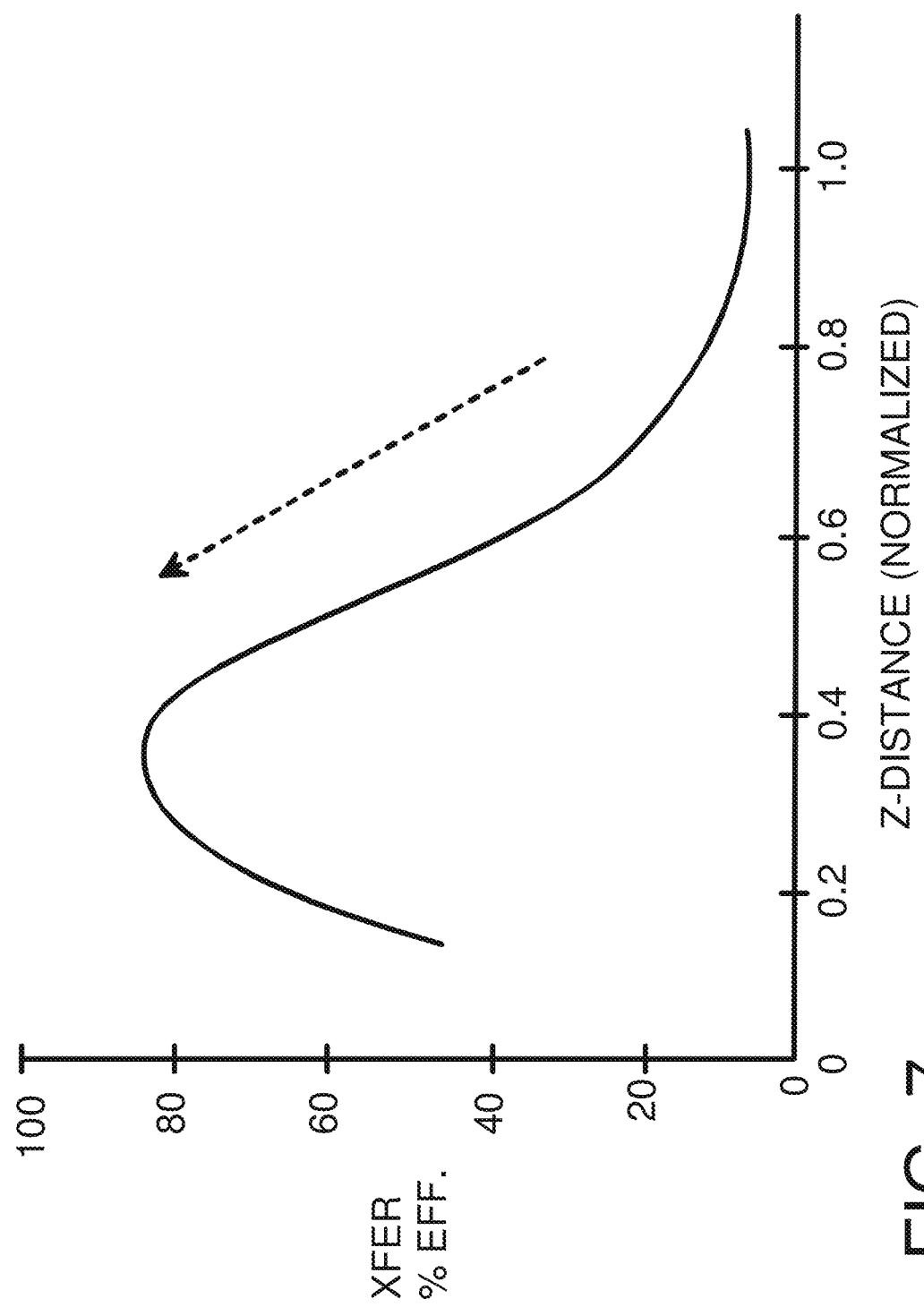
FIG. 7 is a graph of power transfer efficiency as a function of out-of-plane mis-alignment.

FIG. 7 is a graph of wireless power transfer efficiency as a function of out-of-plane mis-alignment. When powered, electromagnets 20, 30, 40, 50 pull central moving plate 135 in three dimensions to better align with magnets on the receiver. The movements perpendicular to the plane of central moving plate 135 are referred to as out-of-plane or Z movement.

Unlike the X,Y curve of FIG. 6, the Z curve of FIG. 7 has a maximum efficiency at a non-zero distance. The maximum efficiency occurs at a normalized Z distance of about 0.4, not at 0, for this particular wireless power transfer system. When the transmitter and receiver are pulled closer from a farther pre-aligned distance, power transfer efficiency initially improves, but later diminishes once the maxima is passed. In a particular case when the transmitter and receiver are touching each other, at a Z distance of 0, the power transfer efficiency has fallen significantly. Even though well-aligned in the X,Y directions, having the two coils too close in the Z dimension may cause the wireless power transfer efficiency to drop significantly due to over-coupling in a magnetic resonance system.

When the maximum attractive electromagnetic force is applied in step 302 (FIG. 5), this maximum force may pull the transmitter and receiver too close together, causing a reduction in power transfer efficiency. For example, the maximum force may pull the transmitter to the receiver with a normalized distance of 0.2, where efficiency is only 60%.

The inventors have realized that after the maximum attractive electromagnetic force is applied, this force can be reduced to move the transmitter to a greater Z distance for a higher power transfer efficiency. For example, the electromagnetic force may be reduced slightly to allow the normalized distance to increase from 0.2 to 0.4, resulting in a significant increase in power transfer efficiency from 60% to 80%.

Depending on the physical and electrical characteristics of transmitter and receiver, the power transfer efficiency can be very sensitive to the Z distance. For small distances, power transfer efficiency can be more sensitive to Z distance than to X,Y distance.

Figure 8:
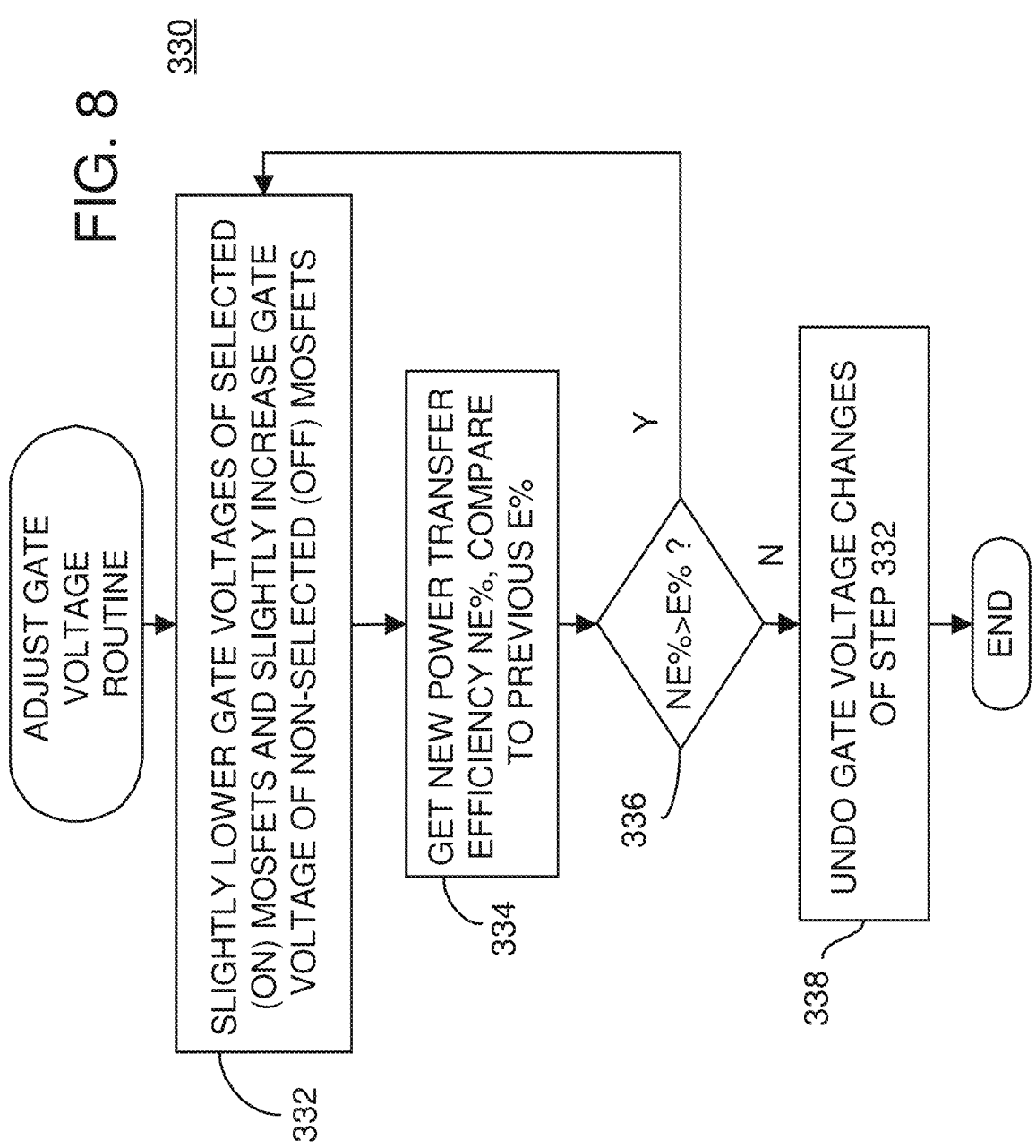
FIG. 8 is a flowchart of a gate-voltage adjustment routine.

FIG. 8 is a flowchart of a gate-voltage adjustment routine. Gate voltage adjustment routine 330 is activated when the maximum attractive force is applied in step 302 (FIG. 5) but the power transfer efficiency is below the efficiency threshold.

The high gate voltages are lowered slightly, and the low gate voltages are raised slightly, step 332. This gate voltage adjustment causes less current to flow through the electromagnets, lowering the attractive force and therefore enlarging the distance between the transmitter and receiver. The power transfer efficiency is again measured, step 334. This newly-measured power transfer efficiency NE % is compared to the prior power transfer efficiency E %, step 336. When NE % is greater than the prior E %, the efficiency has improved, and the direction of adjustment is correct. The gate-voltage adjustment is repeated, step 332, and NE % becomes E % and is compared to a newer measurement of power transfer efficiency, NE %, step 334.

The high gate voltages are adjusted downward and the low gate voltages are adjusted upward as step 332 is repeated until the new power transfer efficiency is no longer larger than the prior power transfer efficiency, step 336. Then the last gate voltage adjustment of the prior instance of step 332 is undone, step 338, to restore the maximum power transfer efficiency in the prior loop. Thus the maximum power transfer efficiency is obtained by gradually adjusting the gate voltages until power transfer efficiency no longer improves.

In some situations, it is possible that the magnetic polarity of electromagnets 20, 30, 40, 50 may be reversed by gate voltage adjustment routine 330. As the high gate voltages are reduced and the low gate voltages are raised, eventually the high gate voltage may be smaller than the low gate voltage, and the current direction through electromagnets 20, 30, 40, 50 is reversed, resulting in a repulsive electromagnetic force rather than an attractive force at the beginning of gate voltage adjustment routine 330.

When the transmitter and receiver are too close together in the Z direction, gradually reducing the attractive electromagnetic force can improve power transfer efficiency as the Z distance is increased. However, the reduced attractive force also allows for more mis-alignment in the in-plane X,Y direction, which may reduce the power transfer efficiency. The overall power transfer efficiency may reach a maxima at a Z distance than is less than the maxima of FIG. 7, due to the loss of power transfer efficiency caused by X,Y mis-alignment. Gate voltage adjustment routine 330 measures the overall power transfer efficiency and thus finds the overall maxima of the power transfer efficiency when both X,Y and Z mis-alignment effects are taken into account.

Figure 9:
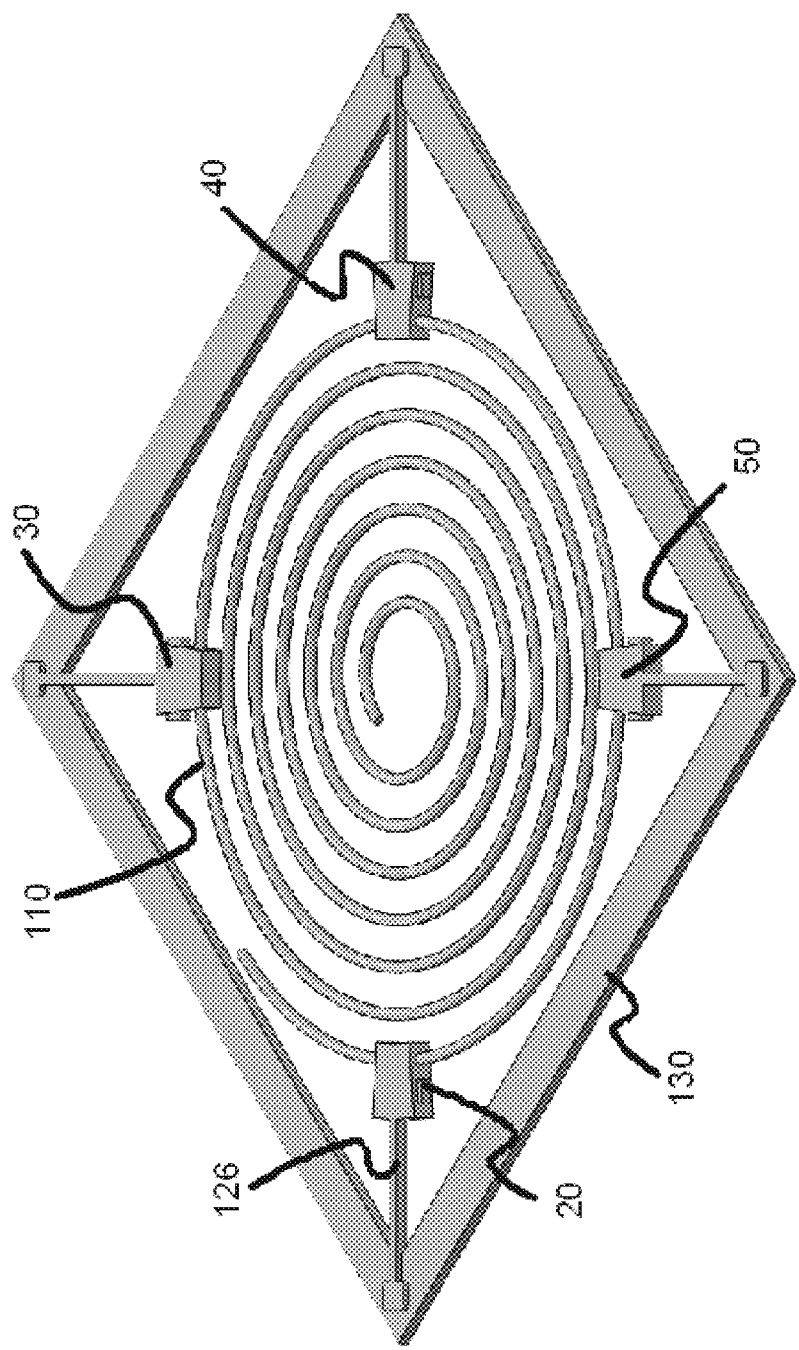
FIG. 9 shows an alternative mechanical design of a self-aligning wireless power transmitter.

FIG. 9 shows an alternative mechanical design of a self-aligning wireless power transmitter. Transmitter coil 110 is free-standing or may be affixed to a central moving plate 135 (not shown). Flexible bars 126 may be elastic or soft such as being made from rubber or another elastic memory material. Flexible bars 126 act as springs 120 to connect transmitter coil 110 to rigid frame 130, allowing transmitter coil 110 to move relative to rigid frame 130, which is fixed to other parts of the transmitter.

Electromagnets 20, 30, 40, 50 are placed in fixed positions in the end tab of flexible bars 126, close to where flexible bars 126 attach to transmitter coil 110, and farther away from the other ends of flexible bars 126 that attach to rigid frame 130.

Flexible wires (not shown) can connect electromagnets 20, 30, 40, 50 and transmitter coil 110 to the driving circuitry of the transmitter that are fixed to rigid frame 130. These flexible wires are sufficiently long to allow electromagnets 20, 30, 40, 50 and transmitter coil 110 to move within rigid frame 130.

Figure 10:
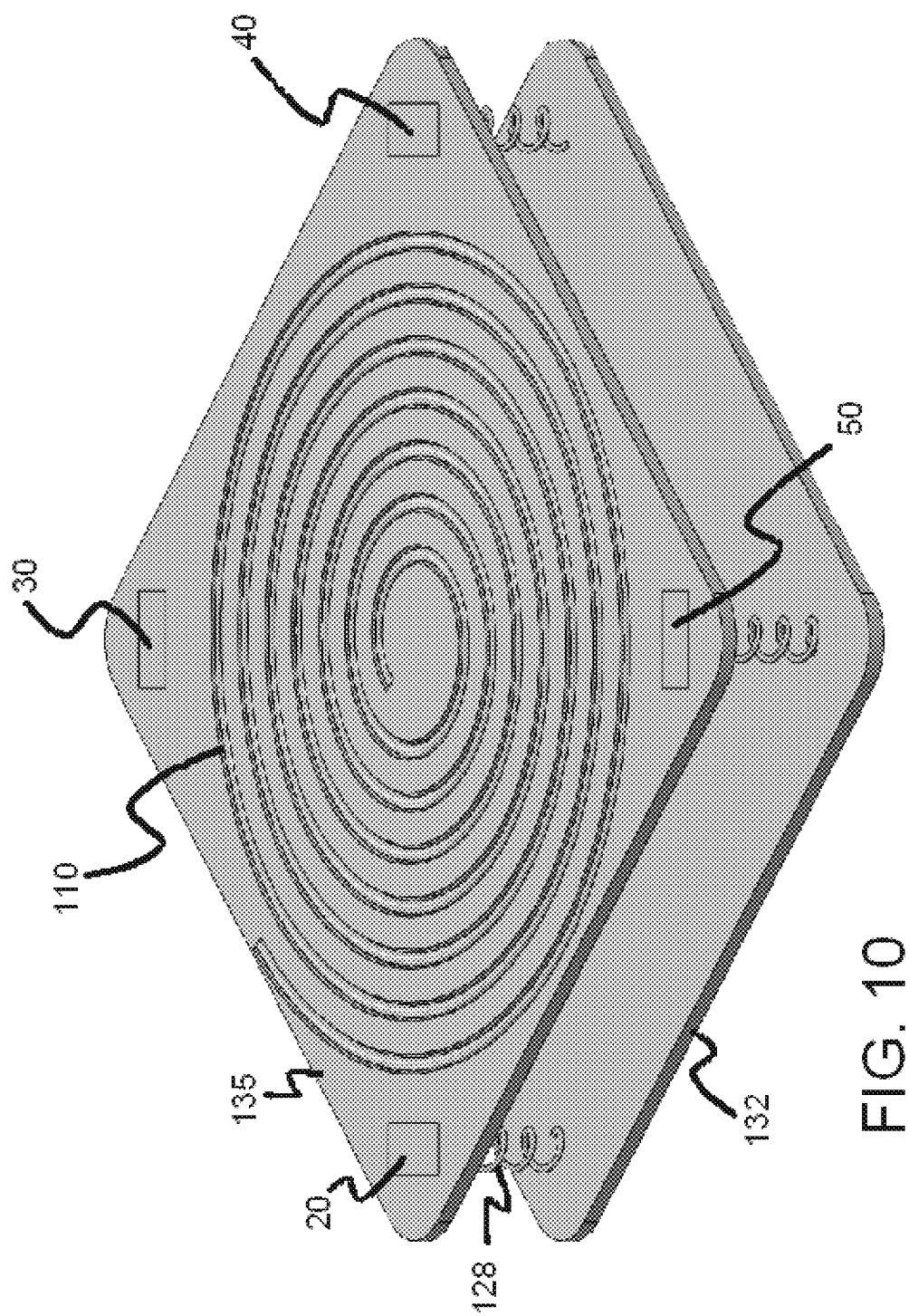
FIG. 10 shows another alternative mechanical design of a self-aligning wireless power transmitter using helical springs.

FIG. 10 shows an alternative mechanical design of a self-aligning wireless power transmitter using helical springs. Transmitter coil 110 is affixed to central moving plate 135 that also has electromagnets 20, 30, 40, 50 affixed in the corners.

Helical springs 128 attach to the bottom of central moving plate 135 and to the top of rigid plate 132. Helical springs 128 allow central moving plate 135 with electromagnets 20, 30, 40, 50 and transmitter coil 110 to move relative to rigid plate 132, which is fixed to other parts of the transmitter.

Flexible wires (not shown) can connect electromagnets 20, 30, 40, 50 and transmitter coil 110 to the driving circuitry of the transmitter that are fixed to rigid plate 132. These flexible wires are sufficiently long to allow electromagnets 20, 30, 40, 50 and transmitter coil 110 to move relative to rigid plate 132.

Figure 11:
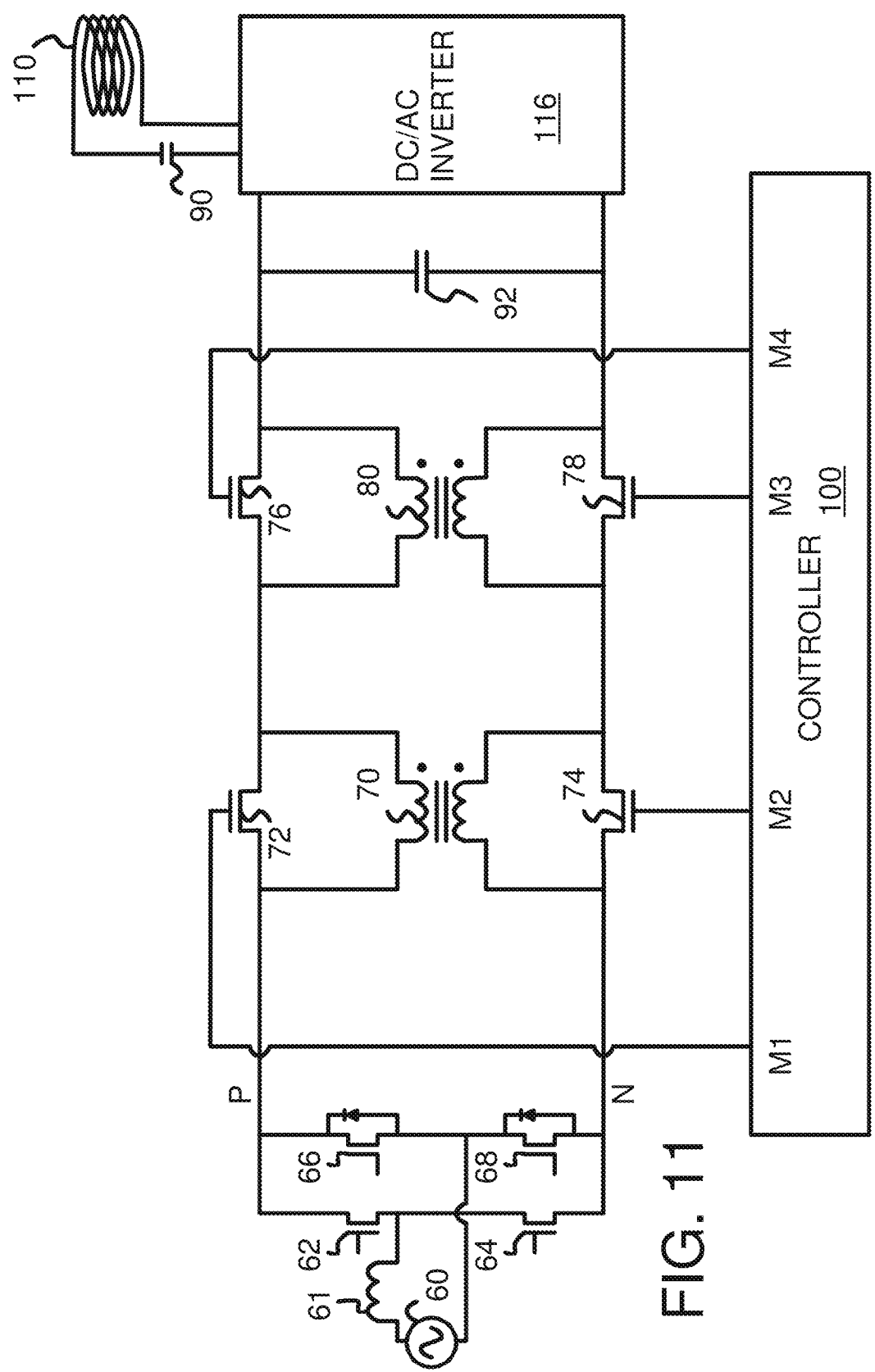
FIG. 11 shows an alternative self-aligning wireless power transmitter circuit using double-winding electromagnets.

FIG. 11 shows a self-aligning resonant wireless power transmitter circuit using double-winding electromagnets. Capacitor 90 is in series with transmitter coil 110, forming an LC resonant circuit that has a resonant frequency that is determined at least in part by the inductance value of transmitter coil 110 and the capacitance value of capacitor 90. When the frequency of the AC current generated by DC/AC inverter 116 applied to transmitter coil 110 is at or close to the resonant frequency, wireless power transfer efficiency is maximized for the current physical configuration. When the AC frequency applied varies from the resonant frequency, such as by more than 30%, then the power transfer efficiency drops noticeably.

Capacitor 92 is a filter capacitor for filtering of the power supply. Capacitor 92 or another capacitor could also be placed between nodes P and N.

Rather than have a single winding, each of electromagnets 70, 80 have two separate windings that are electrically insulated from each other as two separate coils. The two windings are each wrapped around the same central axis.

When controller 100 drives low the gate of transistor 72 and high the gate of transistor 74, current flows through the upper winding of electromagnet 70 towards the right and no current flows through the lower winding of electromagnet 70 towards the left, generating a maximum electromagnetic field with a N pole towards the right.

When controller 100 drives high the gate of transistor 72 and low the gate of transistor 74, current is bypassed around the upper windings of electromagnet 70 and current flows through the lower windings of electromagnet 70 towards the left, generating a maximum electromagnetic field with a N pole towards the left. If both of transistors 72, 74 were driven at the same gate voltage, then electromagnet 70 would generate two electromagnetic fields that cancel each other, thereby a total net electromagnetic field of zero.

Electromagnet 80 is configured to generate an electromagnetic field with a N pole towards the right by controller 100 driving a low gate voltage to transistor 76, and a high gate voltage to transistor 78. When an electromagnetic field with a N pole towards the left is needed on electromagnet 80, controller 100 can drive a high gate voltage to transistor 76, and a low gate voltage to transistor 78.

Electromagnets 70, 80 are both configured for positive polarity when the high gate voltage is applied to transistors 74, 78 to bypass the lower windings, and the low gate voltage is applied to transistors 72, 76 to steer current through the upper windings.

Only two transistors are needed for each dual-winding electromagnet in FIG. 11, compared with four transistors for each electromagnet in FIG. 4. However, dual-winding electromagnets are more expensive and complex than single-winding electromagnets.

AC/DC converter 114 (FIG. 4) has been implemented by the converter circuit of transistors 62, 64, 66, 68 and inductor 61. The gates of transistors 62, 64, 66, 68 can be pulsed in a switching sequence to switch the power supplied from AC power supply 60. Transistors 62, 64, 66, 68 can be Gallium-Nitride (GaN) transistors or can be regular Metal-Oxide-Semiconductor Field-Effect Transistors (MOSFETs).

Alternate Embodiments

Several other embodiments are contemplated by the inventors. While a self-aligning wireless power transmitter has been described, a self-aligning receiver could be constructed. Either or both of the transmitter and the receiver could be fitted with the electromagnets and controller 100 for self-alignment. FIGS. 3, 9, 10 could be on a receiver rather than on a transmitter when transmitter coil 110 is replaced by receiver coil 112 and AC/DC converter 114 is replaced by a DC/DC converter.

The self-alignment system could be applied to wireless power transfer using induction or using magnetic resonance. For a resonant wireless power transfer system, capacitor 90 could be part of DC/AC inverter 116, and other components inside DC/AC inverter 116 also could alter this resonant frequency. Capacitor 90 may be deleted for inductive power transfer systems.

AC/DC converter 114 may convert from standard AC supply voltages such as 110 v/220 v 50 Hz/60 Hz to DC power. DC/AC inverter 116 may then convert the DC power to AC power at or close to a resonant frequency such as 6.78 MHz. The resonant frequency may be adjusted at least by adjusting the capacitance of a capacitor in series with transmitter coil 110.

While transistors 22 . . . 58 in FIG. 4 each could be an n-channel Metal-Oxide-Semiconductor Field-Effect Transistor (MOSFET), p-channel transistors could be substituted with controller 100 generating inverted gate voltages. Other kinds of transistors could be substituted, such as depletion or enhancement mode, GaN, Gallium-Arsenide (GaAs), bipolar, etc. Other kinds of components with a switching function, or that provide enabling or bypassing of the parallel electromagnet may be substituted. Various estimates and approximations may also be used for generating the wireless power transfer efficiency E %.

The receiver could send the power or current and voltage measurements to the transmitter over a standard wireless link, such as a separate Bluetooth or Wifi link between the transmitter and receiver. The transmitter could also modulate the signal from transmitter coil 110 to transmit this data to the receiver, and the receiver could modulate receiver coil 112 to send its power measurements back to the transmitter. A current sensor and a voltage sensor could be added to DC/AC inverter 116 to determine the transmitted power of transmitter coil 110. The current/voltage sensing functions and wireless communication could be integrated with controller 100 so that DC/AC inverter 116 can be a standard block.

Magnetic polarity can be considered to be arbitrary as it depends on the point of reference. Attraction occurs when two magnets have opposite poles pointing toward each other, such as N and S, or S and N. Repulsion occurs when two magnets have the same poles pointing toward each other, such as N and N, or S and S. Positive polarity could be associated with N or could be associated with S, depending on the definition used.

The magnets in the receiver could be permanent or fixed magnets or could be electromagnets or some combination. The transmitter's electromagnet should be driven to have the opposite polarity to the receiver magnet pole pointing toward it. For example, when the receiver has a S pole of a magnet or electromagnet toward the air gap, electromagnet 20 in the transmitter should be energized to have a N pole pointed toward the receiver to ensure an attractive force.

When electromagnets are used, the receiver electromagnet should be energized by current flow so that the transmitter and receiver poles pointing toward the intervening air gap have opposite polarities. For example, when electromagnet 20 of the transmitter is energized to have a N pole toward the air gap, the corresponding receiver electromagnet should be energized to have a S pole pointing toward the air gap. If the transmitter's electromagnets 20, 30, 40, 50 have N, S, N, S poles, their corresponding receiver magnets should have S, N, S, N poles, respectively, for attraction. If gate voltage adjustment routine 330 causes a magnetic polarity reversal to create a repulsive force to increase the Z distance, then the transmitter and receiver polarities would also match once the transmitter electromagnet reversed polarity.

The maximum current flow and the settings for high and low gate voltages to achieve the maximum attractive force could be preset to different values, depending on the application or conditions such as temperature. The maximum may be set to a value to prevent damage to the electromagnets or to other circuitry. The maximum may be set based on lab tests or system trials, such as to a value sufficiently high to pull together the transmitter and receiver based on a typical pre-alignment or a worst-case pre-alignment error. Systems that have better pre-alignment may require a lower maximum gate voltage than systems with poor pre-alignment. Rather than initially apply a maximum attractive force, a lesser force could be initially applied, and the control routines adjusted. Many variations in the control routines are possible.

Some systems may not have as strong of a dependence of power transfer efficiency on Z distance as shown in FIG. 7. Some systems such as inductive coupling wireless power transfer systems without resonance may have an efficiency maxima near Z=0 and thus not have the curve shape as shown. These systems may not need to use gate voltage adjustment routine 330.

The efficiency threshold TH (step 310 FIG. 5), may be set to various values depending on the system and application. Systems with steeper power transfer efficiency curves, better self-alignment, larger attractive forces, or higher power transfer requirements may allow for higher efficiency threshold values. The voltage adjustment step size (FIG. 8, step 332) may be adjusted to larger values for faster convergence, or to smaller steps for more precise adjustments to reach the maxima. The step size could initially be large and later be reduced when approaching the maxima.

The power transfer efficiency can be approximated or estimated. Ratios of power factors such as current may be used to estimate the power transfer efficiency. More complex routines could be substituted and steps added or re-ordered to the flowcharts of FIGS. 5, 8. Different values of the efficiency threshold TH in FIG. 5 step 310 could be substituted, or other thresholds used and at other steps for other control purposes. Many variations in the control routine are possible. Controller 100, gate voltage adjustment routine 330, and other processes could be implemented in hardware, logic gates, programmable logic, a microcontroller, firmware, software, a processor, or various combinations. Controller 100 could include gate voltage generating and adjusting circuitry such as voltage dividers or more complex circuitry such as a DAC, and control sequencers such as a processor or a state machine. Many embodiments and circuits of AC/DC converter 114 and DC/AC inverter 116 are possible. AC/DC converter 114 could be eliminated if a DC power source is substituted for AC power supply 60. Other components such as filters, capacitors, resistors, clamps, protection devices, etc. may be added to various circuit nodes. Transmitter coil 110 and receiver coil 112 can have various physical shapes, winding arrangements, and patterns. Receiver coil 112 could have more than one winding loop. Each winding loop could have a different number of windings to provide different voltages to the receiver.

While only two electromagnets 70, 80 are shown in FIG. 11, there could be four or more electromagnets by adding more transistors in series with transistors 72, 76, and with transistors 74, 78, with each additional pair of transistors controlling current to another dual-winding electromagnet. Then the four dual-winding electromagnets 70, . . . 80 would replace the four electromagnets 20, 30, 40, 50 in FIGS. 3, 9, 10. While four electromagnets 20, 30, 40, 50 have been shown, there could be other numbers and arrangements of electromagnets, such as 1, 2, 3, 6, 8, etc. Some electromagnets could be larger or stronger than others. The electromagnets do not have to be in the same shape or made of the same material.

While equal size transistors such as transistors 72, 74, 76, 78 may be used, the sizes do not have to be equal. Different kinds, types, layouts, or sizes of transistors could be used to allow for larger or smaller currents for a particular gate voltage. The transistors could all be matched, or could be ratioed. Controller 100 could generate different gate voltages as needed. However, having the transistor sizes match simplifies the design.

Other switch networks could be substituted to steer current into or bypass current around the electromagnets. The current being steered into the electromagnets is part of the current that energizes DC/AC inverter 116 to drive transmitter coil 110. Thus the electromagnets do not have to have a separate circuit. The electromagnets are tightly integrated with the main DC circuit.

Rather than adjusting the magnetic force using variable gate voltages, the gate voltages could be pulsed between a high voltage and a low voltage using a Pulse-Width-Modulation (PWM) signal. The pulse-on time could be varied as a substitute to adjusting the gate voltage.

The shortest dimension between transmitter coil 110 and receiver coil 112 when aligned has been described as the Z dimension that spans the air gap between the coils. The in-plane dimensions X,Y are the plane that intersects the axis of the electromagnetic field generated by the coils. Other nomenclature may be substituted.

While the space between transmitter coil 110 and receiver coil 112 has been described as an air gap, this intervening space may be filled by water for undersea systems, a vacuum for space systems, as well as casings, plastic or other enclosures of transmitter coil 110 or receiver coil 112, or bodies or walls of the transmitter or receiver systems, or various combinations and layers of materials.

Many physical arrangements and embodiments are possible. Central moving plate 135 does not have to be rectangular but may be circular or have some other shape that fits within rigid frame 130. Rigid frame 130 could have a more complex shape, and could surround central moving plate 135 (FIG. 3) or be below central moving plate 135 (FIG. 10), or otherwise provide a mount for springs 120 or other flexible support of central moving plate 135. Rigid frame 130 could have a side missing and not completely surround central moving plate 135. Central moving plate 135 might not be in the center but still able to move relative to rigid frame 130. Central moving plate 135 could be any kind of movable member or frame, support, or component. Central moving plate 135 could be implemented by transmitter coil 110 with brackets or other connectors attached to the coil to support or attached electromagnets 20, 30, 40, 50, or 70, 80 to the coil.

Many kinds of springs or spring-like or flexible connectors could be used to support central moving plate 135 and allow for relative movement to the rigid frame and receiver. A track or sliding system could be used for facilitating movement. Portions of the receiver could be mounted onto central moving plate 135 while other portions of the receiver are on rigid frame 130 or other rigid parts.

While descriptions of physical mechanisms such as magnetic fields and current flows and operations have been presented, these are theoretical and the theories may be incomplete or even incorrect. Terms such as up, down, above, under, horizontal, vertical, inside, outside, X, Y, Z, are relative and depend on the viewpoint and are not meant to limit the invention to a particular perspective. Currents may be considered to be positive or negative and flow in either direction. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A self-aligning wireless power transmitter comprising:
a movable mount;
an electromagnet fixed to the movable mount;
a transmitter coil fixed to the movable mount, the transmitter coil generating a power-transferring electromagnetic field that transfers power to a receiver coil on a receiver when the transmitter coil and the receiver coil are aligned;

a transistor that switches a first current into the electromagnet in response to a gate voltage applied to the transistor;

a controller that generates the gate voltage with a voltage that is adjusted to adjust a strength of an aligning electromagnetic field generated by the electromagnet to adjust a force applied to the movable mount by the aligning electromagnetic field generated by the electromagnet to move the movable mount to adjust an alignment between the transmitter coil and the receiver coil; and a power converter that receives the first current and a first bypass current that bypasses the electromagnet, the power converter generating a second current from the first current and the first bypass current;

wherein the second current is applied to and passes through the transmitter coil to generate the power-transferring electromagnetic field;

wherein the first current passes through the electromagnet to generate the aligning electromagnetic field, wherein the first current powers the electromagnet and also at least partially powers the power converter to power the transmitter coil to transfer power to the receiver, wherein the power converter is a Direct Current (DC)/Alternating Current (AC) inverter;

wherein the first current through the electromagnet is a DC current;

wherein the second current through the transmitter coil is an AC current;

wherein the electromagnet is powered by DC and the transmitter coil is powered by AC current; an AC/DC converter that receives AC power from an AC power source, and generates a DC output that includes the first current and the first bypass current that are DC;

wherein alignment is performed by the DC current passing through the electromagnet;

wherein wireless power transfer to the receiver is performed by the AC current passing through the transmitter coil;

wherein the electromagnet and the transistor comprise a plurality of switchable elements, wherein each switchable element in the plurality of switchable elements comprises:

an element input;

an element output;

an element electromagnet having a first terminal connected to a first element node and a second terminal connected to a second element node;

a first element transistor having a gate receiving a first gate voltage from the controller for controlling current through the first element transistor between the element input and the first element node;

a second element transistor having a gate receiving a second gate voltage from the controller for controlling current through the second element transistor between the element input and the second element node;

a third element transistor having a gate receiving a third gate voltage from the controller for controlling current through the third element transistor between the first element node and the element output; and a fourth element transistor having a gate receiving a fourth gate voltage from the controller for controlling current through the fourth element transistor between the second element node and the element output;

a first switchable element and a second switchable element connected in series on a positive power line between the AC/DC converter and the DC/AC inverter; and a third switchable element and a fourth switchable element connected in series on a power-return line between the AC/DC converter and the DC/AC inverter;

whereby the electromagnet is integrated into a power circuit that powers the power converter to power the transmitter coil.

2. The self-aligning wireless power transmitter of claim 1, further comprising the receiver with the receiver coil;

wherein the electromagnet comprises at least four electromagnets each fixed to a different location on the movable mount;

at least four receiver magnets, fixed to different locations on the receiver, wherein the at least four receiver magnets are located to align with the at least four electromagnets on the transmitter when the receiver is aligned to the transmitter;

wherein the transistor comprises at least four transistors, each transistor for controlling a first current through one of the at least four electromagnets in response to a gate voltage from the controller;

wherein the controller generates a plurality of gate voltage signals to the at least four transistors.

3. The self-aligning wireless power transmitter of claim 1, wherein the transistor is connected between a first terminal and second terminal to the electromagnet, wherein the first bypass current flows through the transistor and the first current flows through the electromagnet, wherein the transistor adjusts a ratio of the first current and the first bypass current in response to the gate voltage from the controller.

4. A self-aligning wireless power transmitter comprising:

a movable mount;

an electromagnet fixed to the movable mount;

a transmitter coil fixed to the movable mount, the transmitter coil generating a power-transferring electromagnetic field that transfers power to a receiver coil on a receiver when the transmitter coil and the receiver coil are aligned;

a transistor that switches a first current into the electromagnet in response to a gate voltage applied to the transistor;

a controller that generates the gate voltage with a voltage that is adjusted to adjust a strength of an aligning electromagnetic field generated by the electromagnet to adjust a force applied to the movable mount by the aligning electromagnetic field generated by the electromagnet to move the movable mount to adjust an alignment between the transmitter coil and the receiver coil; and a power converter that receives the first current and a first bypass current that bypasses the electromagnet, the power converter generating a second current from the first current and the first bypass current;

wherein the second current is applied to and passes through the transmitter coil to generate the power-transferring electromagnetic field;

wherein the first current passes through the electromagnet to generate the aligning electromagnetic field, wherein the first current powers the electromagnet and also at least partially powers the power converter to power the transmitter coil to transfer power to the receiver, wherein the power converter is a Direct Current (DC)/ Alternating Current (AC) inverter;
wherein the first current through the electromagnet is a DC current;
wherein the second current through the transmitter coil is an AC current;
wherein the electromagnet is powered by the DC current and the transmitter coil is powered by the AC current;
an AC/DC converter that receives AC power from an AC power source, and generates a DC output that includes the first current and the first bypass current that are DC;
wherein alignment is performed by DC current passing through the electromagnet;
wherein wireless power transfer to the receiver is performed by the AC current passing through the transmitter coil;
wherein the electromagnet and the transistor comprise:
a first dual-winding electromagnet having a first winding with a first terminal connected to a positive power line from the AC/DC converter and a second terminal connected to a middle positive node, and having a second winding with a first terminal connected to a negative power line from the AC/DC converter and a second terminal connected to a middle negative node;
a first positive-line transistor having a gate receiving a first gate voltage from the controller for controlling current through the first positive-line transistor between the positive power line from the AC/DC converter and the middle positive node;
a first negative-line transistor having a gate receiving a second gate voltage from the controller for controlling current through the first negative-line transistor between the negative power line from the AC/DC converter and the middle negative node;
a second dual-winding electromagnet having a first winding with a first terminal connected to the middle positive node and a second terminal connected to a positive power line to the DC/AC inverter, and having a second winding with a first terminal connected to the middle negative node and a second terminal connected to a negative power line to the DC/AC inverter;
a second positive-line transistor having a gate receiving a third gate voltage from the controller for controlling current through the second positive-line transistor between the middle positive node and the positive power line to the DC/AC inverter; and
a second negative-line transistor having a gate receiving a fourth gate voltage from the controller for controlling current through the second negative-line transistor between the middle negative node and the negative power line to the DC/AC inverter;
whereby the electromagnet is integrated into a power circuit that powers the power converter to power the transmitter coil.

5. The self-aligning wireless power transmitter of claim 4, further comprising:
a capacitor in series with the transmitter coil, the capacitor for adjusting a resonant frequency of a transmitter with the transmitter coil, wherein the transmitter coil transfers power at a higher efficiency when operating at the resonant frequency than when operating at a first non-resonant frequency that is higher than the resonant frequency by at least 30%, or when operating at a second non-resonant frequency that is lower than the resonant frequency by at least 30%;
wherein the controller initially generates an initial gate voltage to apply to the transistor to cause the electromagnet to generate an initial aligning electromagnetic field that causes the movable mount to move the transmitter coil from a pre-aligned position into an initial alignment position;
wherein the controller subsequently adjusts the gate voltage to adjust the aligning electromagnetic field to move the movable mount into a new alignment position.

6. The self-aligning wireless power transmitter of claim 5, wherein
the controller compares a prior power transfer efficiency for a prior alignment position to a new power transfer efficiency for the new alignment position;
wherein the controller continues to adjust the gate voltage when the new power transfer efficiency is larger than the prior power transfer efficiency by an adjustment of the gate voltage;
wherein the controller removes an adjustment to the gate voltage when the new power transfer efficiency is less than the prior power transfer efficiency and a maxima of power transfer efficiency is reached.

7. The self-aligning wireless power transmitter of claim 6, wherein power transfer efficiency is estimated by a ratio of a receiver measurement of a power factor of power received by the receiver coil to a transmitter measurement of a power factor of power transmitted by the transmitter coil.

8. The self-aligning wireless power transmitter of claim 7, wherein
the transmitter measurement of the power factor is the second current that passes through the transmitter coil;
wherein the receiver measurement of the power factor is an induced current flowing through the receiver coil that is induced by magnetic resonance of the power-transferring electromagnetic field generated by the transmitter coil.

9. The self-aligning wireless power transmitter of claim 1, further comprising: a capacitor in series with the transmitter coil, the capacitor for adjusting a resonant frequency of a transmitter with the transmitter coil, wherein the transmitter coil transfers power at a higher efficiency when operating at the resonant frequency than when operating at a first non-resonant frequency that is higher than the resonant frequency by at least 30%, or when operating at a second non-resonant frequency that is lower than the resonant frequency by at least 30%;
wherein the controller initially generates an initial gate voltage to apply to the transistor to cause the electromagnet to generate an initial aligning electromagnetic field that causes the movable mount to move the transmitter coil from a pre-aligned position into an initial alignment position;
wherein the controller subsequently adjusts the gate voltage to adjust the aligning electromagnetic field to move the movable mount into a new alignment position.

10. The self-aligning wireless power transmitter of claim 9, wherein the controller compares a prior power transfer efficiency for a prior alignment position to a new power transfer efficiency for the new alignment position;
wherein the controller continues to adjust the gate voltage when the new power transfer efficiency is larger than the prior power transfer efficiency by an adjustment of the gate voltage;
wherein the controller removes an adjustment to the gate voltage when the new power transfer efficiency is less than the prior power transfer efficiency and a maxima of power transfer efficiency is reached.

11. The self-aligning wireless power transmitter of claim 10, wherein power transfer efficiency is estimated by a ratio of a receiver measurement of a power factor of power received by the receiver coil to a transmitter measurement of a power factor of power transmitted by the transmitter coil.

12. The self-aligning wireless power transmitter of claim 11, wherein the transmitter measurement of the power factor is the second current that passes through the transmitter coil;
  wherein the receiver measurement of the power factor is an induced current flowing through the receiver coil that is induced by magnetic resonance of the power-transferring electromagnetic field generated by the transmitter coil.

* * * * *